(12) United States Patent
Jiang

(10) Patent No.: US 11,223,083 B2
(45) Date of Patent: Jan. 11, 2022

(54) PACKAGE AND BATTERY

(71) Applicant: Ningde Amperex Technology Limited, Fujian (CN)

(72) Inventor: Jing Jiang, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 97 days.

(21) Appl. No.: 16/716,584

(22) Filed: Dec. 17, 2019

(65) Prior Publication Data

US 2020/0365837 A1    Nov. 19, 2020

(30) Foreign Application Priority Data

Oct. 18, 2018   (CN) .......................... 201811216460.2

(51) Int. Cl.
| | |
|---|---|
| *H01M 2/04* | (2006.01) |
| *H01M 50/116* | (2021.01) |
| *H01M 50/10* | (2021.01) |
| *H01M 50/131* | (2021.01) |

(52) U.S. Cl.
CPC ......... *H01M 50/116* (2021.01); *H01M 50/10* (2021.01); *H01M 50/131* (2021.01); *H01M 2220/30* (2013.01)

(58) Field of Classification Search
CPC .. H01M 50/116; H01M 50/10; H01M 50/131; H01M 2220/30
See application file for complete search history.

(56) References Cited

U.S. PATENT DOCUMENTS

2016/0329595 A1* 11/2016 Kang ................... H01M 50/116
2017/0338449 A1* 11/2017 Rho ..................... H01M 50/116

FOREIGN PATENT DOCUMENTS

CN           107112446 A       8/2017

* cited by examiner

*Primary Examiner* — Jane J Rhee
(74) *Attorney, Agent, or Firm* — Westerman, Hattori, Daniels & Adrian, LLP

(57) ABSTRACT

The present application provides a package and a battery, the package comprises a first surface, the first surface is provided with a first concave part and a first convex part which are connected with each other, the package further comprises an first elastomer, and the first elastomer is disposed in the first concave part. The purpose of the present application is to at least enable a battery to be protected well during the bending process of the battery.

20 Claims, 9 Drawing Sheets

PACKAGE AND BATTERY

CROSS-REFERENCE TO RELATED APPLICATION

This application claims priority to and the benefit of Chinese Patent Application No. 201811216460.2 filed on Oct. 18, 2018, the entire content of which is incorporated herein by reference.

FIELD OF THE APPLICATION

The present application relates to the technical field of electrochemistry, in particular, to a package and a battery.

BACKGROUND OF THE APPLICATION

In order to meet the market demand for thinning, lightweight and high capacity on the power supply of the electronic device, to develop flexible mobile devices such as roll-type flexible electronic devices or displays and to fully utilize mobile device space, power supplies of such mobile devices are required to have the characteristics of flexibility, bendability and form variability.

However, the conventional bag-type batteries lack of elasticity, cannot withstand repeated bending and have the problems of package breakage and failure. For example, the existing flexible strap battery is formed by, injection molding and fixation of single small bag-type batteries arrangement, wherein one flexible strap integrally requires packaging operation on a plurality of cells, causing high process cost, and a single cell itself does not have flexibility, such that the cell can be only bended to a certain degree due to the width limitation of the cell, causing insufficient bending degree. And single cell needs to be wired out, which makes high difficulty for the process operation. In addition, the interfaces between the package of the battery and the cell are not bonded well, so that a gap is formed during a process of repeated bending, thus causing defective contact between the interfaces, which makes the battery properties to be greatly decayed. Therefore, the development of an integral flexible battery becomes particularly important.

SUMMARY OF THE APPLICATION

For the above problems in the related art, the present application provides a package and a battery, so as to at least enable the battery to be protected well during the bending process of the battery.

The present application is implemented as follows:

According to one aspect of present application, there is provided a package for packaging a cell, the package includes a first surface which is provided with a first concave part and a first convex part which are connected with each other, the package further includes a first elastomer disposed in the first concave part.

According to embodiments of the present application, a bottom of the first concave part and a top of the first convex part are arc-shaped structures. The package further includes a second surface arranged oppositely to the first surface, the second surface and the first surface form the same side part of the package. The second surface includes a second concave part and a second convex part, the first concave part is opposite to the second convex part, and the first convex part is opposite to the second concave part. The package further includes a second elastomer, the second elastomer is disposed in the second concave part, and the second elastomer is parallel with the first elastomer.

According to embodiments of the present application, the first surface further includes a third concave part and a third convex part which are connected with each other, the third concave part is connected with the first convex part.

According to embodiments of the present application, the package further includes a third elastomer. A bottom of the third concave part is an arc-shaped structure, the third elastomer is disposed in the third concave part, and the third elastomer is parallel with the first elastomer.

According to embodiments of the present application, the package further includes a fourth elastomer disposed in the fourth concave part. The second surface further includes a fourth concave part and a fourth convex part which are connected with each other, the fourth convex part is opposite to the third concave part, and the fourth concave part is opposite to the third convex part.

According to embodiments of the present application, the second surface further includes a fourth concave part and a fourth convex part which are connected with each other, the fourth convex part is opposite to the third concave part, and the fourth concave part is opposite to the third convex part. An elastomer does not exist in the fourth concave part.

According to embodiments of the present application, a distance between the first elastomer and the third elastomer is equal to a distance between the second elastomer and the fourth elastomer; the first elastomer, the second elastomer, the third elastomer and the fourth elastomer have a same size and shape.

According to embodiments of the present application, the distance between the first elastomer and the third elastomer is equal to the distance between the second elastomer and the fourth elastomer.

According to embodiments of the present application, a length of the first elastomer is unequal to a length of the third elastomer, or a width of the first elastomer is unequal to a width of the third elastomer.

According to embodiments of the present application, wherein a material of the first elastomer includes any one of styrene-butadiene rubber and silicone rubber.

According to another aspect of present application, there is provided a battery, the battery includes a cell and a package, the package includes a first surface, the first surface is provided with a first concave part and a first convex part which are connected with each other. And the package further includes an first elastomer, and the first elastomer is disposed in the first concave part. The cell is accommodated in the package.

According to embodiments of the present application, the battery further includes an elastic housing, and the elastic housing is disposed outside the package.

According to embodiments of the present application, the package includes only one cell, a bending structure adapting to the package exists on a surface of the cell, and the second surface is bonded with the cell.

According to embodiments of the present application, the package includes a first region covering the cell and a second region surrounding the first region, and the first elastomer is arranged in the first region.

According to embodiments of the present application, the battery further includes a fifth elastomer, the fifth elastomer is arranged between the cell and the package in a length direction of the package.

According to embodiments of the present application, a gap surrounding the package is provided between the elastic housing and the package.

According to embodiments of the present application, the cell includes an electrode tab and an insulator, the elastic housing includes an opening for accommodating the electrode tab, and the insulator is disposed between the opening and the electrode tab.

According to embodiments of the present application, a length of the electrode tab includes: a length L4a from one end positioned outside the elastic housing to an outermost side of the elastic housing, a length L4b from an outermost side of the elastic housing to the package, and a length L4c positioned in the package. L4a is greater than L4b and is less than the sum of L4c and L4b, and L4b is less than or equal to L4c.

According to embodiments of the present application, the cell includes a first electrode sheet, a second electrode sheet and a separator for separating the first electrode sheet and the second electrode sheet.

According to embodiments of the present application, the first electrode sheet and the second electrode sheet are formed by coating with corresponding part current collector or a whole current collector.

In the package and the battery of the present application, a first concave part and a first convex part which are connected with each other are formed on the first surface of the package, the first concave part is provided with a first elastomer, so that a stress generated during the bending process of the battery may be buffered and absorbed by the first elastomer, thereby protecting the bending positions of electrode sheet of the battery and the package well. In addition, since the first elastomer is arranged in the first concave part, a waste of the overall capacity space is avoided.

BRIEF DESCRIPTION OF THE DRAWINGS

In order to illustrate the technical schemes in the embodiments of the present application or in the prior art more clearly, the drawings which are required to be used in the description of the embodiments of the present disclosure are briefly described below, it is obvious that the drawings described below are only some embodiments of the present application, it is apparent to those of ordinary skill in the art that other drawings may be obtained based on accompanying drawings without inventive effort.

DETAILED DESCRIPTION OF THE EMBODIMENTS

The package and the battery of the present application will be clearly and completely described in the following with reference to the accompanying drawings. It should be understood that the corresponding exemplary embodiments in the following descriptions and drawings can be combined mutually, so that other execution modes which are not described below; furthermore, a part of components can be omitted in different embodiments. In other words, the following description does not limit the present application.

Figure 1:
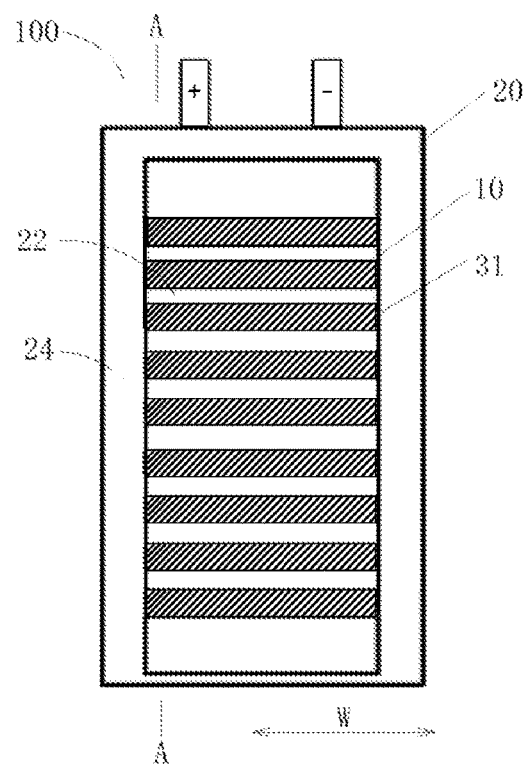
FIG. 1 illustrates a top view of a battery according to the embodiment of the present application.
Figure 2:
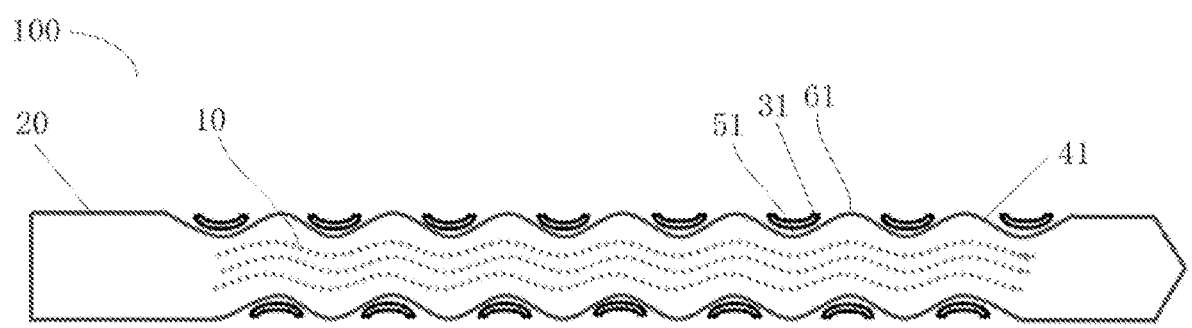
FIG. 2 illustrates a cross-sectional view along A-A in FIG. 1.

As shown in FIG. 1 and FIG. 2, the embodiment of the present application discloses a battery 100, the battery 100 includes a cell 10 and a package 20, and the package 20 wraps the cell 10. The package 20 includes a first surface 41, and the first surface 41 includes a first concave part 51 and a first convex part 61 which are connected with each other. And a bottom of the first concave part 51 is an arc-shaped structure. The battery 100 further includes a first elastomer 31, and the first elastomer 31 is disposed in the first concave part 51.

It should be understood that FIG. 2 shows the case where the first surface 41 is an outer side surface of the package 20. In an embodiment, the first surface 41 may be an inner side surface of the package 20, and the inner side surface is a surface, adjacent to the cell 10, of the package 20. In a thickness direction of the battery 100, the cell 10 has a first side (such as upper side) and a second side (such as lower side). FIG. 2 shows the case where the first concave part 51 and the first convex part 61 are disposed on the first side and the second side. It should be understood that the first concave part 51 and the first convex part 61 may be disposed on any one of the first side and the second side of the cell 10. Therefore, the first concave part 51 and the first convex part 61 which are connected with each other are formed on the first surface 41 of the package 20, and the first concave part 51 is provided with a first elastomer 31, so that a stress generated during the bending process of the battery can be buffered and absorbed by the first elastomer 31, thereby protecting a bending positions of the cell and the package well. In addition, since the first elastomer 31 is arranged in the first concave part 51, a waste of the overall capacity space is avoided.

Wherein the first elastomer 31 and the first concave part 51 of the package 20 may be fixedly connected with each other through any suitable physical modes, so that the first elastomer 31 and the first concave part 51 are tightly bonded and contacted, for example, the first elastomer 31 is adhered by glue. In some embodiments, a material of the first elastomer 31 includes any one of styrene-butadiene rubber and silicone rubber.

As shown in FIG. 1, in some embodiments, the package 20 includes a first region 22 covering the cell 10 and a second region 24 surrounding the first region 22, and the first elastomer 31 is arranged in the first region 22. The first region 22 may be used for accommodating an electrode and an electrolyte of the cell 10, and the second region 24 surrounds the first region 22 to form the sealed second region 24. In an embodiment, the first convex part 61 and the first concave part 51 may be arranged in the first region 22. In an embodiment, the first convex part 61 and the first concave part 51 may be arranged in the region 22 and the first second region 24. The region where the first elastomer 31 is arranged may be determined according to the specific application conditions of the present application, which is not limited herein.

Figure 3:
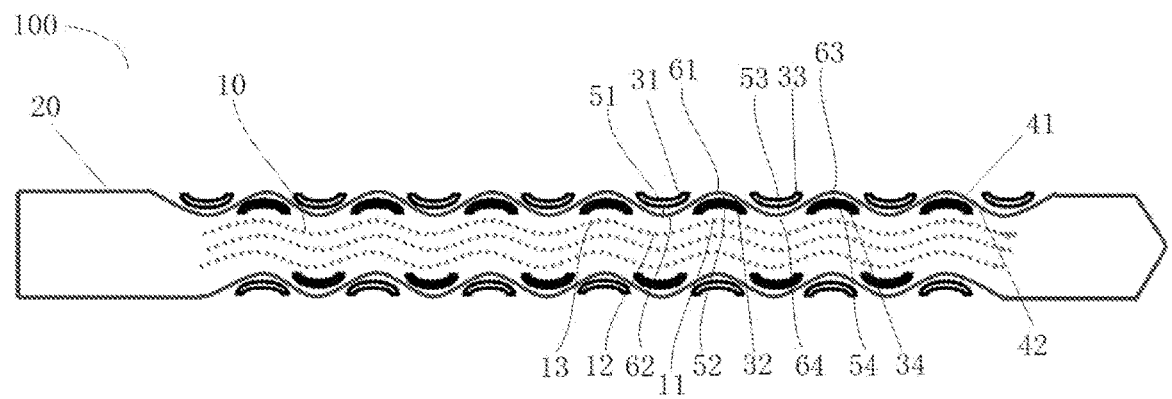
FIG. 3 illustrates a cross-sectional view of a battery according to an embodiment of the present application.

With further reference to FIG. 3, the package 20 further includes a second surface 42, and the second surface 42 and the first surface 41 are arranged oppositely. The second surface 42 and the first surface 41 form the same side part of the package 20. The same side part may be any one side part of the package 20 in the thickness direction of the battery, such as an upper side part or a lower side part. The second surface 42 includes a second concave part 52 and a second convex part 62. A top of the first convex part 61 is an arc-shaped structure. The first concave part 51 of the first surface 41 is opposite to the second convex part 62 of the second surface, and the first convex part 61 of the first surface 41 is opposite to the second concave part 52 of the second surface 42. In addition, the battery 100 further includes a second elastomer 32, and the second elastomer 32 is disposed in the second concave part 52. The first elastomer 31 and the second elastomer 32 extend in a width direction of the battery; and, in the width direction, the second elastomer 32 is parallel with the first elastomer 31. The first elastomer 31 and the second elastomer 32 are arranged in the concave parts of the first surface 41 and the second surface 42 of the package 20 respectively to fill a gap between the cell and the package 20, so as to ensure that the cell and the package 20 may be tightly bonded during the bending process of the battery, thereby maintaining the properties of the battery.

The first surface 41 further includes a third concave part 53 and a third convex part 63 which are connected with each other. Wherein, the third concave part 53 is connected with the first convex part 61. In some embodiments, the battery 100 further includes a third elastomer 33. Wherein, the third elastomer 33 is disposed in the third concave part 53, and a bottom of the third concave part is an arc-shaped structure. The third elastomer 33 extends in the width direction of the battery, and the third elastomer 33 is parallel with the first elastomer 31 in the width direction. The first elastomer 31 and the third elastomer 33 may be arranged on the first surface 41 repeatedly and alternately. The number of the first elastomer 31 and the third elastomer 33 does not constitute any limit on the present application. The stress generated during the bending process of the battery may be buffered and absorbed uniformly by continuously arranged the first elastomer 31 and the third elastomer 33 on the first surface 41.

Continuously referring to FIG. 3, the second surface 42 further includes a fourth concave part 54 and a fourth convex part 64 which are connected with each other, the fourth convex part 64 is opposite to the third concave part 53, and the fourth concave part 54 is opposite to the third convex part 63. In an embodiment, the battery 100 may further include a fourth elastomer 34, and the fourth elastomer 34 is disposed in the fourth concave part 54. The second elastomer 32 and the fourth elastomer 34 may be arranged on the second surface repeatedly and alternately. The stress generated during the bending process of the battery may be further buffered and absorbed uniformly by continuously arranged the second elastomer 32 and the fourth elastomer 34 on the second surface.

In an embodiment, the elastomer does not exist in the fourth concave part 54. That is to say, on the second surface, the elastomers are not continuously arranged in each fourth concave part 54. The storage space of electrolyte in the package may be increased by the discontinuous setting of the elastomers.

With reference to FIG. 3 also, in an embodiment, the package 20 includes only one cell 10. Wherein, the surface of the cell 10 has a bending structure adapting to the package 20. Specifically, at the position corresponding to the second convex part 62 of the second surface, a cell surface 13 is provided with a convex part 12 opposite to the second convex part 62. And at the position corresponding to the second concave part 52 of the second surface, the cell surface 13 is provided with a concave part 11 opposite to the second concave part 52. And the second surface is bonded with the cell 10. The shape of the package 20 and the shape of the cell surface are mutually matched, so that when the cell 10 is bended, the cell 10 has the same direction with the second convex part 62 and the second concave part 52 of the second surface, thereby preventing cracking caused by non-uniform stress of the cell structure (such as electrode sheet) when the cell is bended.

Figure 4:
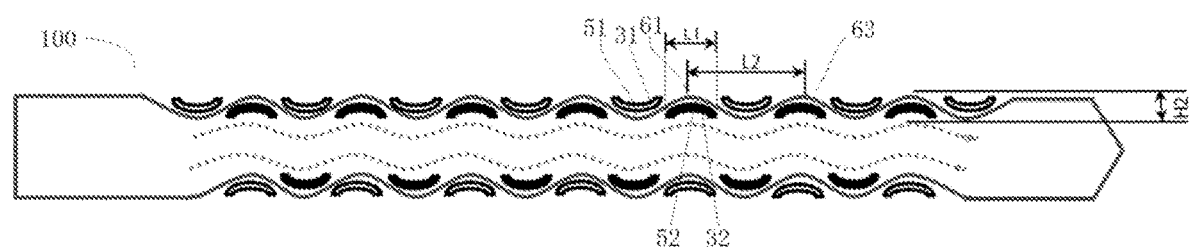
FIG. 4 illustrates a cross-sectional view of a battery extending to be flat according to an embodiment of the present application.

As shown in FIG. 4, a thickness of the first elastomer 31 is not more than a height H2 of the first convex part 61 or the first concave part 51. A width of the elastomer (such as a width L1 of the second elastomer 32) is less than a distance L2 between a highest point of the first convex part 61 and a highest point of the third convex part 63. A length of the first elastomer 31 is not more than a width of the first region 22 (see FIG. 1).

Figure 5:
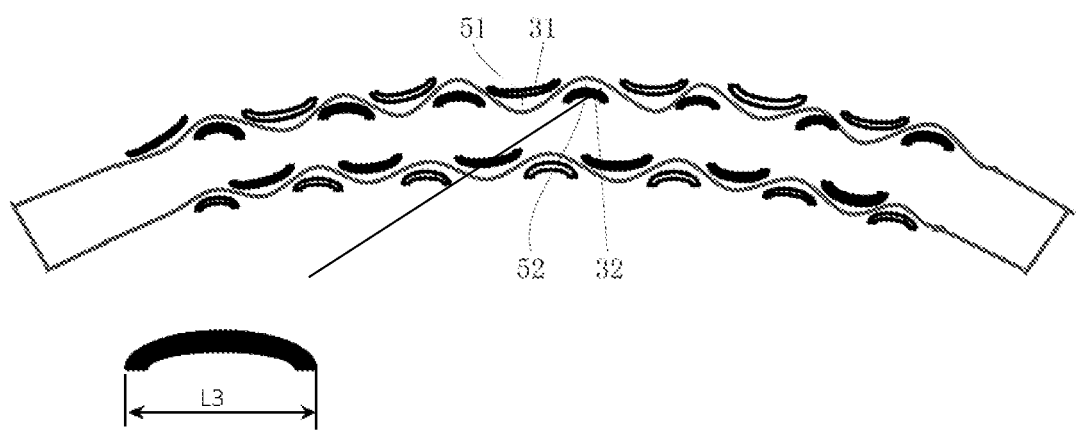
FIG. 5 illustrates a cross-sectional view of a package when a battery is bended according to an embodiment of the present application.
Figure 6A:
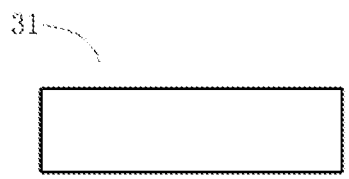
FIG. 6A to FIG. 6D illustrate schematic views of a first elastomer according to an embodiment of the present application.
Figure 6B:
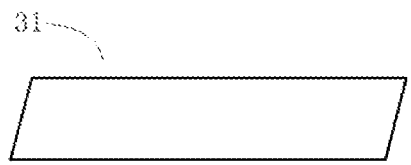
Figure 6C:
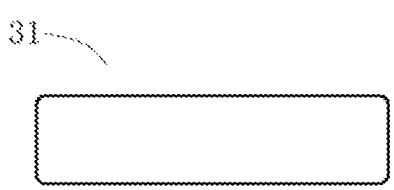
Figure 6D:

With reference to FIG. 4 and FIG. 5, along with bending of the battery, the first elastomer 31 filled in the first concave part 51 is expanded outwards, the second elastomer 32 filled in the second concave part 52 is retracted inwards, and a horizontal width L3 of the second elastomer 32 in a bending state is 20%-80% of the width L1 in the spreading state. As shown in FIG. 6A to FIG. 6D, in some embodiments, the shape of the first elastomer 31 may be any one of rectangle, parallelogram, oval and the like. It should be understood that the second elastomer 32, the third elastomer 33 and the fourth elastomer 34 may have the above structural configuration similar to the first elastomer 31.

Figure 7A:
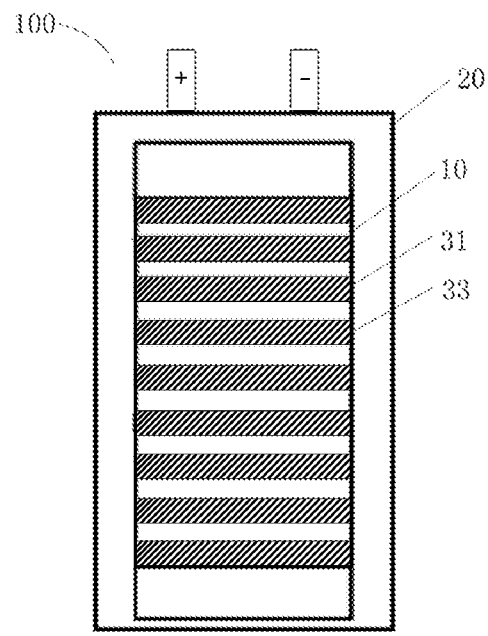
FIG. 7A to FIG. 7D illustrate top views of batteries according to multiple embodiments of the present application.

With reference to FIG. 7A, a distance between the first elastomer 31 and the third elastomer 33 is equal to a distance between the second elastomer 32 and the fourth elastomer 34. The first elastomer 31, the second elastomer 32, the third elastomer 33 and the fourth elastomer 34 have a same size and shape. The stress generated during the bending process of the battery may be further buffered and absorbed uniformly by the uniform setting of the first elastomers 31 to the fourth elastomers 34.

Figure 7B:
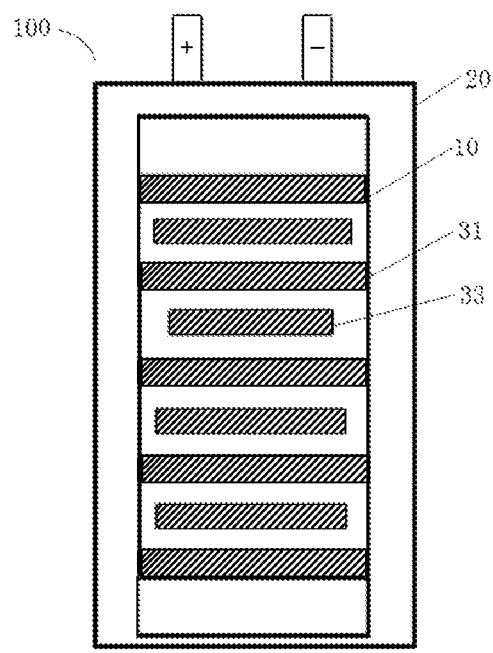
Figure 7C:
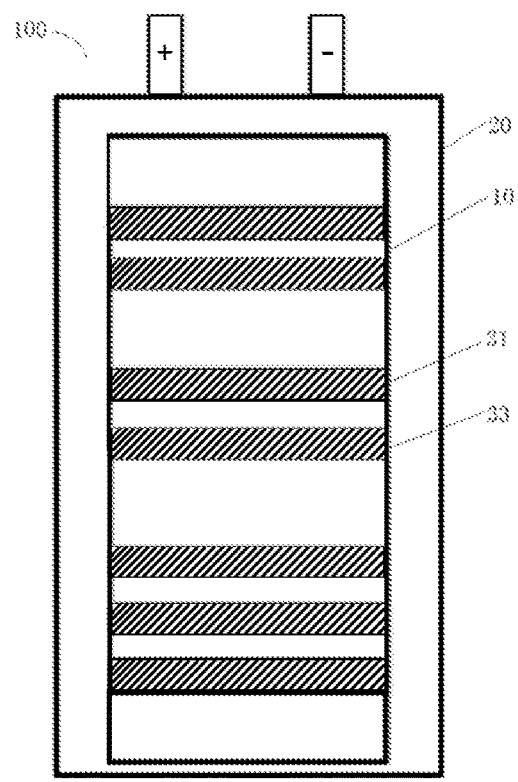
Figure 7D:
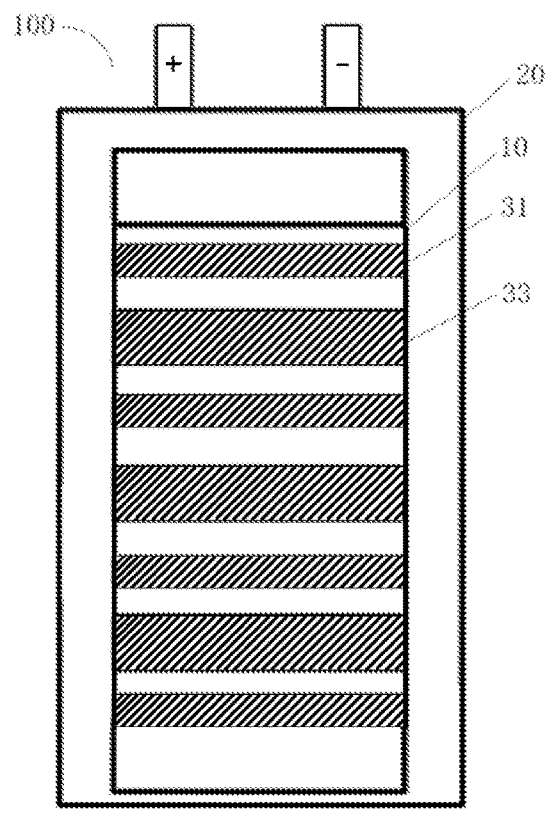
Figure 8:
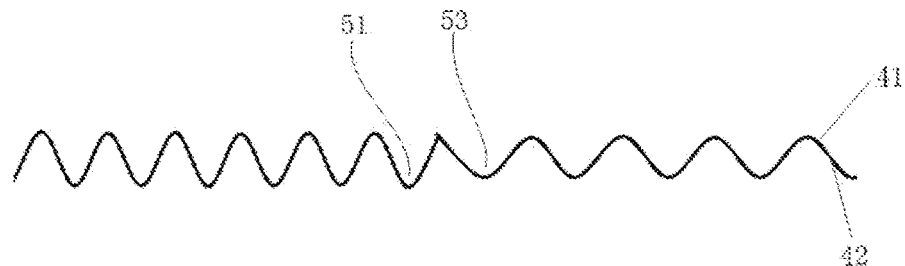
FIG. 8 illustrates a cross-sectional view of a first surface and a second surface of a package according to an embodiment of the present application.

As shown in FIG. 7B to FIG. 7D, in an embodiment, the distance between the first elastomer 31 and the third elastomer 33 is unequal to the distance between the second elastomer 32 and the fourth elastomer 34. In an embodiment, the lengths or widths of the first elastomer 31 and the third elastomer 33 are unequal. In this way, the storage space of electrolyte in the package may be increased. Specifically, as shown in FIG. 7B, a length of the first elastomer 31 is unequal to a length of the third elastomer 33. As shown in FIG. 7C, the distance between the first elastomer 31 and the third elastomer 33 is unequal to the distance between the second elastomer 32 and the fourth elastomer 34. As shown in FIG. 7D, a width of the first elastomer 31 is unequal to a width of the third elastomer 33. In an embodiment, as shown in FIG. 8, a size of the first concave part 51 is different from a size of the third concave part 53, correspondingly, the width of the first elastomer 31 arranged in the first concave part 51 may be unequal to the width of the third elastomer 33 arranged in the third concave part 53.

Figure 9:
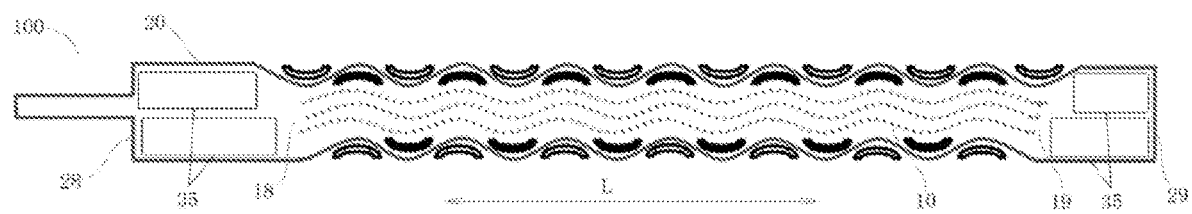
FIG. 9 illustrates a cross-sectional view of a battery according to an embodiment of the present application.

As shown in FIG. 9, the battery 100 of the present application may further include a fifth elastomer 35. The fifth elastomer 35 is arranged between the cell 10 and the package 20 in a length direction of the package 20. Specifically, in the length direction of the package 20, the cell is provided with two ends 18 and 19, the package 20 is provided with two ends 28 and 29, and the fifth elastomers 35 are arranged between the end 18 and the end 28 as well as between the end 19 and the end 29. The ends of the cell and the package are filled with the elastomers, and the bending generated by extrusion of the end parts of the cell and the package when the battery is bended may be avoided, so that the fact that the package is pierced and corroded by the cell is avoided and powder falling and demolding of the electrode sheets of the cell are avoided.

Figure 10A:
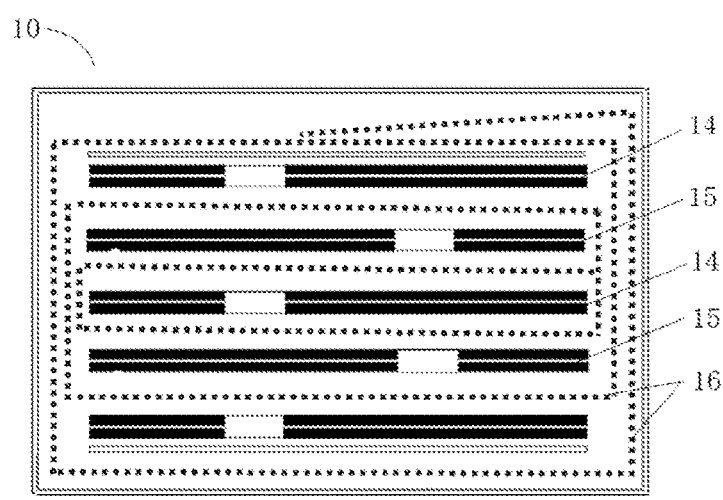
FIG. 10A to FIG. 10C illustrate schematic views of a cell according to an embodiment of the present application.
Figure 10B:
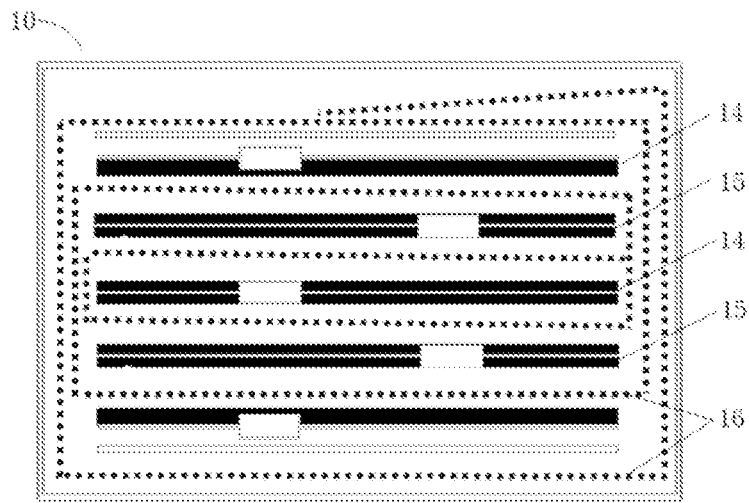
Figure 10C:
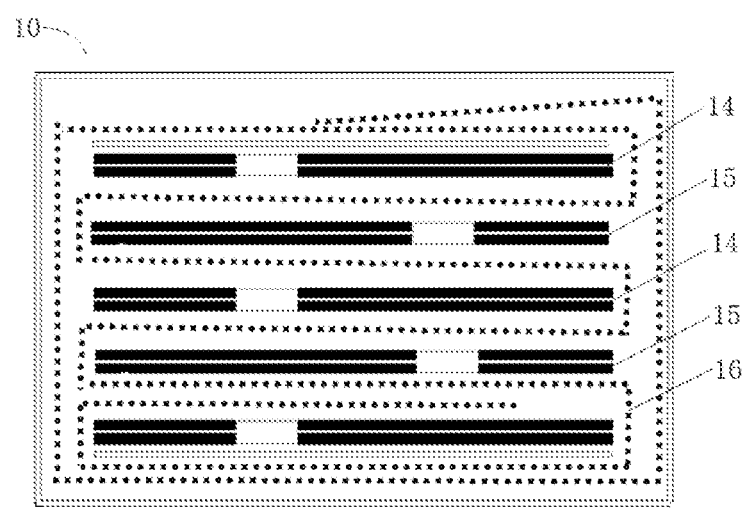

As shown in FIG. 10A to FIG. 10C, in the battery 100 of the present application, the cell 10 includes a first electrode sheet and a second electrode sheet, and the first electrode sheet and the second electrode sheet are formed by coating with corresponding part current collector or a whole current collector. The cell 10 also includes a separator for separating the first electrode sheet and the second electrode sheet. Specifically, the cell 10 may be formed by folding and stacking the first electrode sheet and the second electrode sheet. As shown in FIG. 10A and FIG. 10B, the separator may wind and wrap the first electrode sheet and the second electrode sheet. As shown in FIG. 10C, the separator may be set to Z-shaped folding.

Figure 11:
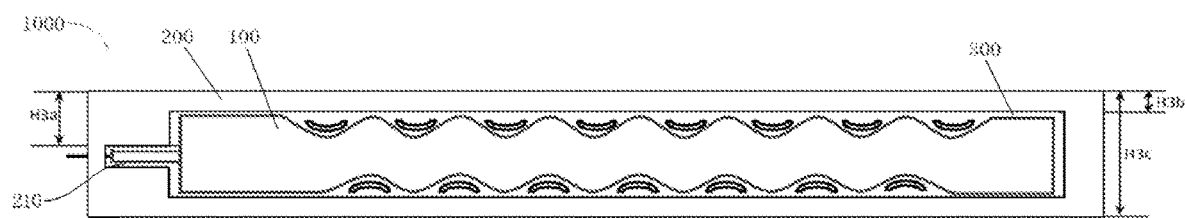
FIG. 11 illustrates a cross-sectional view of a battery according to the embodiments of the present application.

As shown in FIG. 11, the battery 1000 of the present application is shown. It should be understood that the above battery 100 and the elastic housing 200 wrapping the battery 100 may be arranged in the battery 1000. Furthermore, various execution modes of the battery 100 may be applied to the battery 1000, and the application is not limited thereto. In an embodiment, as shown in FIG. 11 as an example, the battery 1000 adopts the embodiment of the battery 100 as shown in FIG. 2.

Further with reference to FIG. 11, a gap 300 surrounding the battery 100 is formed between the elastic housing 200 and the battery 100. Specifically, a cavity may be formed in the elastic housing through injection molding or blow molding operation to accommodate the battery 100. The gap 300 is formed between the elastic housing 200 and the battery 100, a buffer space is provided for the bending of the battery 1000.

In some embodiments, a thickness of the elastic housing 200 at each position may meet: a thickness H3c of the bottom and the side sealing edge is 130% to 180% of the thickness of the cell, a thickness H3a of a top sealing region is 100% to 150% of the thickness of the cell, and a thickness H3b of a battery main body region is 20% to 70% of the thickness of the cell.

Figure 12:
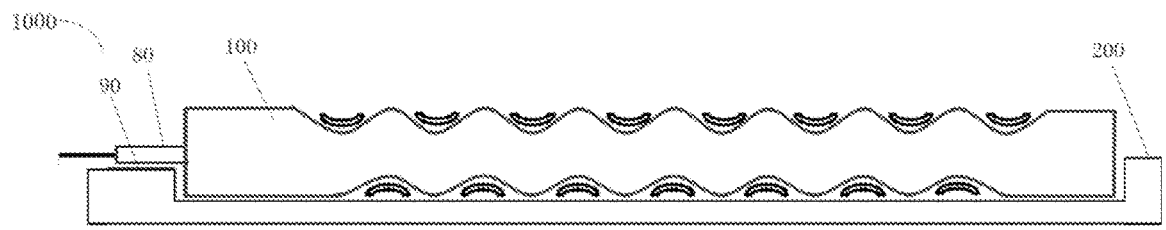
FIG. 12 illustrates a sectional view of part of a battery according to an embodiment of the present application.
Figure 13:
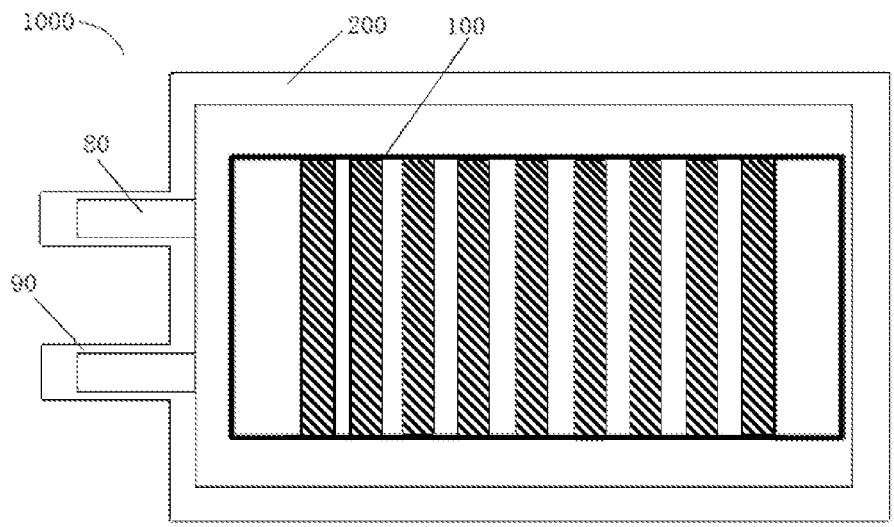
FIG. 13 and FIG. 14 illustrate top views of a battery according to an embodiment of the present application.

With reference to FIG. 11 to FIG. 13, the battery 100 includes an electrode tab 80 and an insulator 90, the elastic housing 200 includes an opening that accommodates the electrode tab 80, and the insulator 90 is disposed between the opening and the electrode tab 80. A material of the insulator may adopt an elastic rubber material. In some embodiments, the parts of the elastic housing 200 corresponding to the electrode tab 80 stretching out of the package 20 and the insulator 90 are fixed integrally. In some embodiments, the insulator 90 is configured to a tubular structure surrounding the electrode tab 80. The insulator 90 may be a tubular structure of cylinder, elliptic cylinder and prism. In some embodiments, an inner diameter of the insulator 90 is in the range of 1.2 to 2 times a width of the electrode tab 80, and a wall thickness of the insulator 90 is in the range of 30 μm to 200 μm. By arranged the insulator 90 on the electrode tab 80 stretching out of the elastic housing 200, the electrode tab 80 and the elastic housing 200 were isolated, so that the electrode tab 80 may be protected, and failure caused by bending and short-circuit may be avoided.

Figure 14:
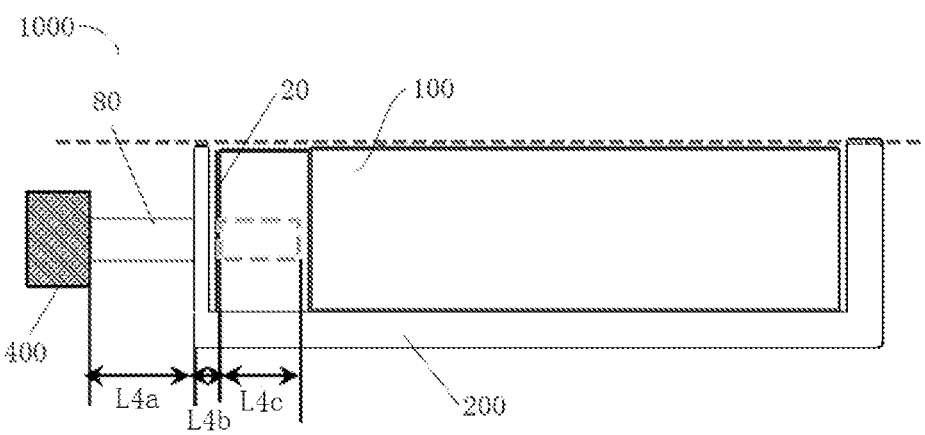

As shown in FIG. 14, L4a is a length from one end, positioned outside the elastic housing 200, of the electrode tab 80 to an outermost side of the elastic housing 200. In an embodiment, one end, positioned outside the elastic housing 200, of the electrode tab 80 may be connected to a circuit board 400. L4b is a length of the electrode tab 80 from the outermost side of the elastic housing 200 to the package 20, and L4c is a length of the electrode tab 80 positioned in the package 20. Wherein, in consideration of the situation where the battery is applied to an actual application terminal, a length of the electrode tab 80 outside the elastic housing 200 and in the package 20 of the battery meets the following relations: L4a is greater than L4b and is less than the sum of L4c and L4b, and L4b is less than or equal to L4c. Thus, a certain welding area, reliability in encapsulation width and balance for energy density may be guaranteed.

The foregoing is merely illustrative of the preferred embodiments of the present application and is not intended to be limiting of the present application, any modifications, equivalent substitutions, improvements, and the like within the spirit and principles of the application are intended to be included within the scope of the present application.

What is claimed is:

1. A package for packaging a cell, comprising a first surface, wherein the first surface is an outer surface of the package and the first surface is provided with a first concave part and a first convex part which are connected with each other, the package further comprises a first elastomer, and the first elastomer is disposed in the first concave part.

2. The package according to claim 1, wherein a bottom of the first concave part and a top of the first convex part are arc-shaped structures;

the package further comprises a second surface, the second surface and the first surface are arranged oppositely, the second surface and the first surface form the same side part of the package, the second surface comprises a second concave part and a second convex part, the first concave part is opposite to the second convex part, and the first convex part is opposite to the second concave part;

wherein the package further comprises a second elastomer, the second elastomer is disposed in the second concave part, and the second elastomer is parallel with the first elastomer.

3. The package according to claim 2, wherein the first surface further comprises a third concave part and a third convex part which are connected with each other;

wherein the third concave part is connected with the first convex part.

4. The package according to claim 3, wherein the package further comprises a third elastomer;

wherein a bottom of the third concave part is an arc-shaped structure, the third elastomer is disposed in the third concave part, and the third elastomer is parallel with the first elastomer.

5. The package according to claim 4, further comprising a fourth elastomer;

the second surface further comprises a fourth concave part and a fourth convex part which are connected with each other, the fourth convex part is opposite to the third concave part, and the fourth concave part is opposite to the third convex part;

wherein the fourth elastomer is disposed in the fourth concave part.

6. The package according to claim 4, wherein the second surface further comprises a fourth concave part and a fourth convex part which are connected with each other, the fourth convex part is opposite to the third concave part, and the fourth concave part is opposite to the third convex part;

wherein an elastomer does not exist in the fourth concave part.

7. The package according to claim 5, wherein a distance between the first elastomer and the third elastomer is equal to a distance between the second elastomer and the fourth elastomer; the first elastomer, the second elastomer, the third elastomer and the fourth elastomer have a same size and shape.

8. The package according to claim 5, wherein the distance between the first elastomer and the third elastomer is equal to the distance between the second elastomer and the fourth elastomer.

9. The package according to claim 5, wherein a length of the first elastomer is unequal to a length of the third elastomer, or a width of the first elastomer is unequal to a width of the third elastomer.

10. The battery according to claim 1, wherein a material of the first elastomer comprises any one of styrene-butadiene rubber and silicone rubber.

11. A battery, comprising a cell and a package, the package comprising a first surface, wherein the first surface is an outer surface of the package and the first surface is provided with a first concave part and a first convex part which are connected with each other, the package further comprises a first elastomer, and the first elastomer is disposed in the first concave part;

wherein the cell is accommodated in the package.

12. The battery according to claim 11, further comprising an elastic housing, and the elastic housing is disposed outside the package.

13. The battery according to claim 11, wherein the package comprises only one cell, a bending structure adapting to the package exists on a surface of the cell, and the second surface is bonded with the cell.

14. The battery according to claim 11, wherein the package comprises a first region covering the cell and a second region surrounding the first region, and the first elastomer is arranged in the first region.

15. The battery according to claim 11, wherein the battery further comprises a fifth elastomer;

wherein the fifth elastomer is arranged between the cell and the package in a length direction of the package.

16. The battery according to claim 12, wherein a gap surrounding the package is provided between the elastic housing and the package.

17. The battery according to claim 12, wherein the cell comprises an electrode tab and an insulator, the elastic housing comprises an opening for accommodating the electrode tab, and the insulator is disposed between the opening and the electrode tab.

18. The battery according to claim 17, wherein a length of the electrode tab comprises: a length L4a from one end positioned outside the elastic housing to an outermost side of the elastic housing, a length L4b from an outermost side of the elastic housing to the package, and a length L4c positioned in the package;

wherein L4a is greater than L4b and is less than the sum of L4c and L4b, and L4b is less than or equal to L4c.

19. The battery according to claim 11, wherein the cell comprises a first electrode sheet, a second electrode sheet and a separator for separating the first electrode sheet and the second electrode sheet.

20. The battery according to claim 19, wherein the first electrode sheet and the second electrode sheet are formed by coating with corresponding part current collector or a whole current collector.

* * * * *